Aug. 11, 1964
W. STELZER
3,143,860
DIVIDED OUTPUT MASTER CYLINDER
Filed May 7, 1962
2 Sheets-Sheet 1
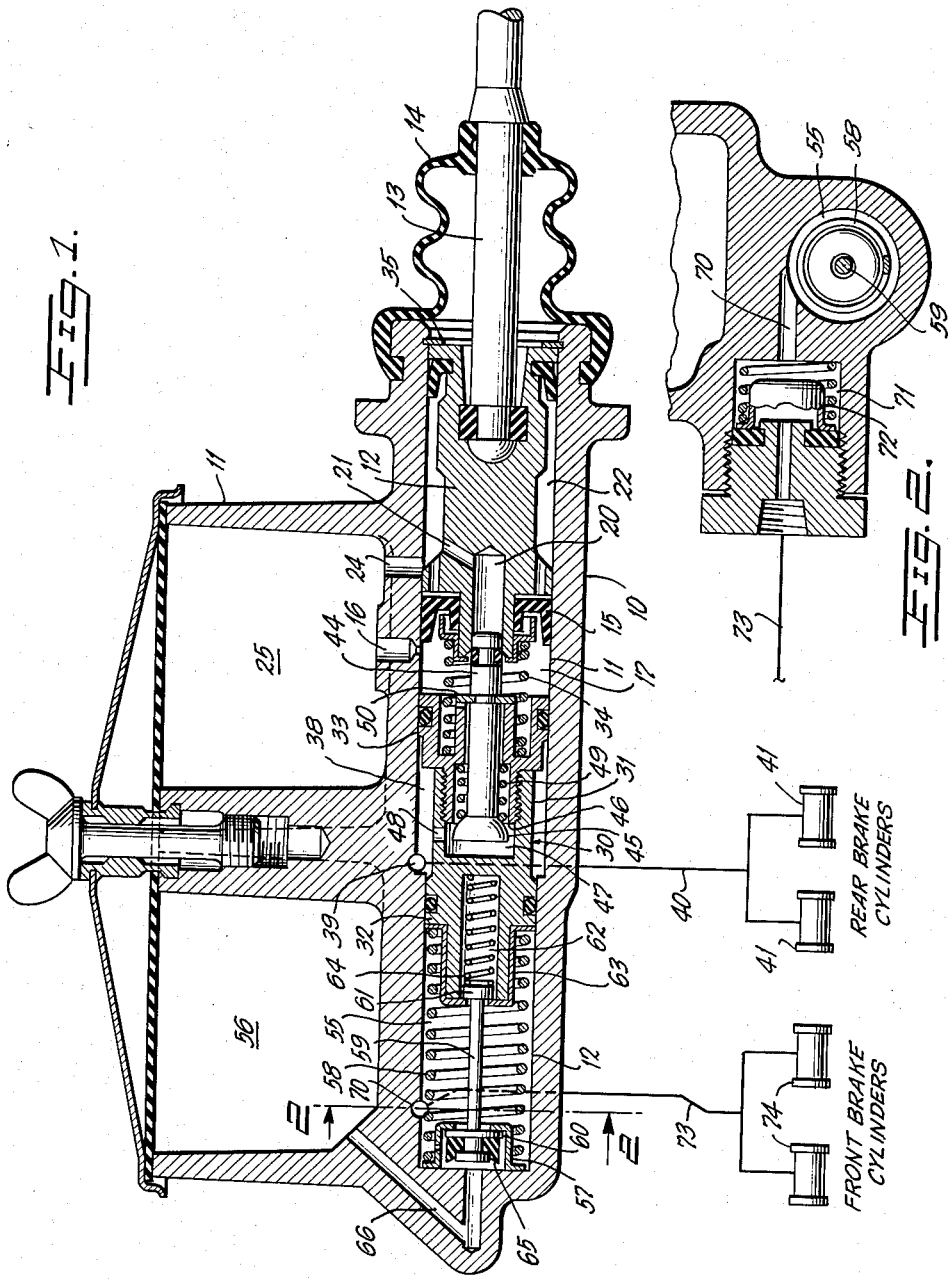
INVENTOR
William Stelzer
BY John F. Phillips
ATTORNEY INVENTOR
William Stelzer
BY John F. Phillips
ATTORNEY United States Patent Office 3,143,860
Patented Aug. 11, 1964

3,143,860
DIVIDED OUTPUT MASTER CYLINDER
William Stelzer, Bloomfield Hills, Mich., assignor to Kelsey-Hayes Company, Romulus, Mich., a corporation of Delaware
Filed May 7, 1962, Ser. No. 192,690
14 Claims. (Cl. 60—54.6)

This invention relates to a divided output master cylinder having separate hydraulic circuits to the front and rear wheel cylinders of a motor vehicle.

An important object of the invention is to obtain substantial weight transfer compensation in the front and rear wheel braking of a motor vehicle with a minimum number of parts and at minimum expense.

A further object is to provide a master cylinder of the general type referred to wherein hydraulic braking pressure is used as a measure of the rate of vehicle deceleration or transfer of weight from the rear to the front during brake application.

A further object is to provide a master cylinder having separate hydraulic connections to the front and rear brake cylinders and which is operable after a predetermined braking pressure is built up in the rear wheels for substantially cutting down the rate of flow of fluid to the rear wheel cylinders, thus building up rear wheel braking pressures at a much lower rate than is true of front wheel braking pressures.

A further object is to provide such a mechanism wherein by the use of simple control means, pressure increases are materially but proportionately reduced to the rear wheel cylinders while being materially increased to the front wheel cylinders.

A further object is to provide a novel arrangement of parts for accomplishing the results referred to wherein larger and smaller displacement chambers which communicate during an initial brake application are cut off from each other under predetermined braking conditions and wherein, in the event a cutting off of fluid between such chambers occurs too early, for example in a panic application of the brakes, increased pressure in the larger of the two chambers referred to will result in re-establishing communication between such chambers until pressure in the smaller chamber reaches the proper ratio to pressure in the chamber from which fluid is displaced to the front wheel cylinders.

Other objects and advantages of the invention will become apparent during the course of the following description.

In the drawings I have shown two embodiments of the invention. In this showing

FIGURE 1 is an axial sectional view through one form of master cylinder, the front and rear brake cylinders and the piping connections thereto being diagrammatically illustrated;

FIGURE 2 is a fragmentary sectional view on line 2—2 of FIGURE 1 showing a residual pressure valve arranged between one master cylinder and its associated hydraulic brake line;

Figure 3:
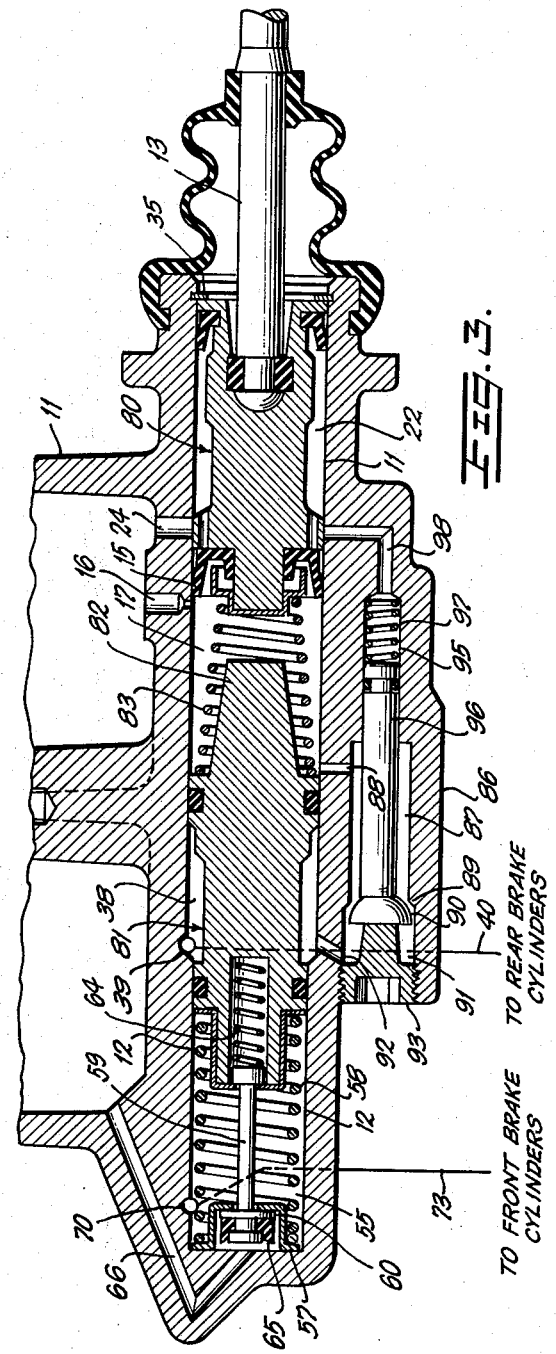
FIGURE 3 is a view similar to FIGURE 1 showing a modified form of the invention.

Referring to FIGURE 1 the numeral 10 designates a master cylinder casting as a whole having relatively larger and smaller stepped bores 11 and 12. The casting 10 is provided with the usual reservoir 11. Within the bore 10 is slidable a plunger 12 operable by a push rod 13, and this rod may be either pedal- or motor-operated. The push rod 13 is sealed in the usual manner by a boot 14. The plunger 12 is sealed in the bore 10 by the usual cup 15, and the usual compensating port 16 is adapted to replenish fluid losses from a chamber 17 arranged forwardly of the plunger 12. This plunger is provided in its forward end with a bore 20 opening as at 21 to the space 22 back of the head of the plunger 12, and such space is conventionally open as at 24 to one of the chambers 25 of the reservoir 11. This reservoir chamber being at atmospheric pressure, it will be apparent that the bore 20 is always at the same pressure.

A stepped plunger indicated as a whole by the numeral 30 comprises a body 31 having a forward head 32 slidable in the bore 12. The plunger 30 includes a rear head 33 preferably threaded to the body 31 and slidable in the bore 11. The seal 15 and head 33 form therebetween the chamber 17 previously described, and a spring 34 engages at its forward end against the head 33 and at its rear end against the plunger 12 to bias the latter to its normal off position in engagement with a stop ring 35.

Within the bore 11 and formed between the heads 32 and 33 is a chamber 38 of limited capacity communicating as at 39, preferably through a residual pressure valve referred to below with hydraulic lines 40 leading to the rear wheel cylinders 41.

A stem 44 has its rear end in sliding sealed engagement with the bore 20 and is provided at its forward end with a valve 45 engageable with a seat 46 formed in the threaded extension of the head 33. The valve 45 is arranged in a chamber 47 communicating as at 48 with the chamber 38. A spring 49 biases the valve 45 forwardly to an open position in which position its movement is limited by a stop ring 50.

A hydraulic pressure chamber 55 is formed in the bore 12 between the head 32 and the forward end of the bore 12. A replenishing valve controls communication between the chamber 55 and the other reservoir chamber 56. Such valve comprises a stamped shell 57, and a spring 58 is arranged between this shell and the plunger head 32 to bias the latter to its off position. A stem 59 is connected at its forward end to a disk 60 arranged in a shell 57, and the forward end of the stem 59 is provided with a head 61 axially movable in a bore 62 formed in the body 31. A flanged spring seat 63, against which the rear end of the spring 58 seats, has its forward end turned inwardly to engage and limit forward movement of the head 61 relative to the head 32. A spring 64 biases the head 61 forwardly.

The disk 60 forms a seat for a resilient normally open valve 65 and such valve controls the lower end of a passage 66 communicating between the interior of the shell 57 and the reservoir chamber 56. It will be apparent that so long as the valve 65 is open compensating fluid is free to flow from the reservoir 56 and the chamber 55.

Forward movement of the plunger 32 as described below allows the spring 64 to seat the valve 65 whereupon pressure will be built up in the chamber 55. This pressure (FIG. 2) will cause hydraulic fluid to flow through a passage 70 in which is arranged a conventional residual pressure valve 72. From this valve, the hydraulic fluid flows through line 73 to the front wheel brake cylinders 74. The residual valve structure in FIGURE 2 may be identical with that employed in conjunction with the opening or passage 39 connected to the chamber 38.

In the form of the invention shown in FIGURE 1 the valve 45 is arranged within the plunger 30 and has an end extending into the bore 20 to be open to atmospheric pressure. A modified form of the invention is shown in FIGURE 3 wherein a corresponding valve has been shown separately from the master cylinder plunger elements and has been arranged in a casing extension formed on the master cylinder body. Those parts of the mechanism in FIGURE 3 which are identical to those in FIGURE 2 have been indicated by the same reference numerals. This is true for example of the master cylinder plunger 80, the parts of which are identical with the plunger 12 in FIGURE 1 except for the elimination of a bore 20 and port 21. The modified form of the invention is provided with the same stepped bores 11 and 12, and the same reservoir and associated elements are employed. Instead of a two-part plunger 30, the corresponding unit in FIGURE 3, indicated as a whole by the numeral 81 may be made unitary with a rearward extension 82 to limit movement of the plunger 80 relative to the plunger 81. A spring 83 between the two plungers biases the plunger 80 to off position. The left-hand end of the plunger 81 may be identical with the corresponding end of the plunger body 31 in FIGURE 1, the same spring 58 being employed to bias the plunger 81 to off position. The relatively small chamber 38 displaces fluid as before through the opening 39 into the rear brake line 40, while fluid from the forward pressure chamber 55 is displaced through an opening 70 into the forward brake line 73.

In the modified form of the invention the master cylinder casting is provided with a lateral longitudinally elongated extension 86 in which is formed a chamber 87 communicating through a port 88 with the master cylinder chamber 17. The forward end of the chamber 87 is formed as a valve seat 89 engageable by a valve 90, corresponding to the valve 45, and normally opening the chamber 87 to a forward chamber 91 communicating as at 92 with the chamber 38. The inner end of a threaded plug 93 normally engages the valve 90 to limit its forward movement.

The extension 86, rearwardly of the chamber 87, is provided with a reduced bore 95 slidably receiving in sealed engagement therewith the forward end of the stem 96 which carries the valve 90. A spring 97 biases the valve 90 to open position. The bore 95 communicates through a passage 98, past the loosely fitting forward head of the plunger 80, with the chamber 22, the bore 95 thus being open to the atmosphere.

Figure 4:
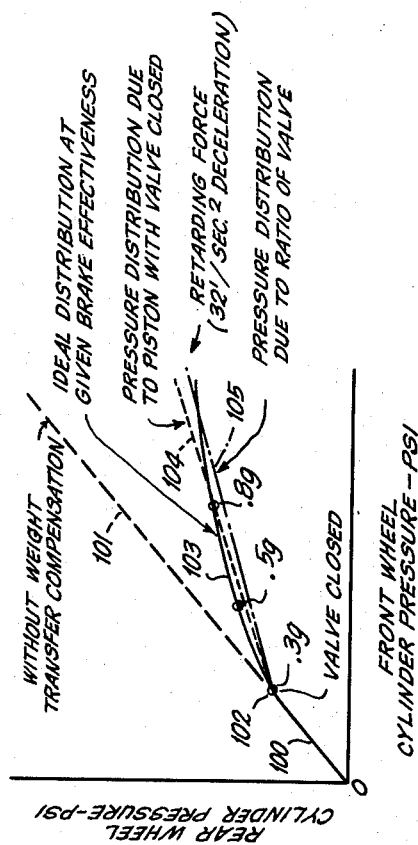
FIGURE 4 is a graph illustrating distribution of braking pressures under different conditions.

In FIGURE 4 there is graphically represented actual and theoretical braking effects under different conditions. Upon the application of the brakes, braking starts from "0" and progresses in both the front and rear wheel cylinders as indicated by line 100. In the absence of the present invention braking pressures in the front and rear wheel cylinders would progress uniformly as indicated by the dotted line 101. The supplying of braking pressure to the front and rear wheel cylinders does not so progress with the present invention due to the operation of the valve 45 or 90. At the point 102, the supply of brake fluid to the rear wheel cylinders starts to increase at a much lower rate than the rate of increase in braking pressures to the front wheel cylinders. The ideal distribution of braking pressures to the front and rear wheels would be as indicated by the line 103. Actual rates of vehicle deceleration are indicated along the line 104. For example, the valve 45 or 90 would close when the deceleration force is one-third of gravity, at approximately 11 ft. per sec.$^2$. Deceleration force at .5 and .8 of gravity are as indicated along the line 103. With the valve 45 or 90 closed at the point 102, the relative rates of increase of hydraulic pressure to the front and rear wheels would be approximately as indicated by the dotted line 104 quite close to the ideal line 103 and coinciding therewith .8 of gravity. The pressure distribution due to the ratio of the valve 45 or 90 is indicated by the dot and dash line 105.

*Operation*

The parts normally occupy the positions shown in FIGURE 1, as stated. The brakes are operated by effecting movement to the left of the push rod 13, either by a brake pedal or motor. The spring 34 is weaker than the spring 58 and accordingly will start to compress. The capacity of the chamber 17 accordingly will reduce and fluid will flow from the chamber 17 past the valve 45 into the chamber 38 and thence through passage 39 to the rear brake cylinders. The generation of hydraulic pressure in the chamber 17 then effects movement of the plunger 30 to initially allow the spring 64 to close the valve 65 and then displace fluid from the chamber 55 through the opening 70 to the front wheel brake cylinders. Movement of the plunger 30 also reduces the capacity of the chamber 38 so that momentarily both of the chambers 17 and 38 will displace fluid through the passage 39 to the rear wheel cylinders.

Since the right-hand area of the stem 44 is exposed to atmospheric pressure in the bore 20, an increase in pressure in the chamber 47 will affect an area of the left-hand face of the valve 45 equal to its area minus the area of the stem 44. This pressure tends to move the valve 45 to closed position and when it is sufficiently high to overcome the spring 49, the valve 45 will close and no further fluid will flow from the chamber 17 into the chamber 38. The valve 45 closes at the point 102 in FIGURE 4.

From this point on, fluid will be displaced to the rear wheel cylinders solely from the chamber 38 of small capacity at a relatively slow rate, At the same time fluid will be displaced from the chamber 55 at a relatively higher rate and at a higher pressure since the effort expended by the push rod 13 will now be proportionately divided between the chambers 55 and 38, no further fluid being expelled from the chamber 17. Accordingly front wheel pressures will increase relatively rapidly as indicated in FIGURE 4, and while pressures will also be increased to the rear wheel cylinders, the rate of increase is much lower than the rate of increase to the front wheel cylinders. The volume of fluid displaced to the rear wheel cylinders obviously will be in fixed relation to the volume of fluid displaced to the front wheel cylinders and the rate of pressure increase to both sets of wheel cylinders is in fixed relation to the ratio of the volume of fluid displaced from the chambers 38 and 55. Obviously, the smaller the annular area of the chamber 38 is in relation to the cross sectional area of the chamber 55, the smaller will be the relative rate of increase in the chamber 38.

It is possible through a panic stop and a rapid operation of the plunger 12 to initially build up a pressure in the chambers 38 and 47 which may result in closing the valve 45 too soon. If this should occur, pressure would be rapidly built up in the chamber 17 and this pressure would act against the right-hand area of the valve 45 between the stem 44 and seat 46. This pressure, assisted by the spring 49, will open the valve 45 for the flow of fluid from the chamber 17 into the chamber 47 to reestablish the proper operating conditions. This will establish a proper balance of the desired ratios of braking pressures in accordance with the showing in FIGURE 4.

The operation of the form of the device shown in FIGURE 3 is the same as that described in connection with FIGURE 1, the only difference being in the location and not in the functioning of the valve 90. The spring 97 tends to maintain the valve 90 unseated, and when, upon operation of the plunger 80 to displace fluid through port 88 into chamber 87, chamber 91, port 92 and chamber 38, the pressure in the chamber 91 reaches the desired point, it will act against the left-hand face of the valve 90 to close it and prevent further displacement of fluid from the chamber 17 into the chamber 38. Thereafter, fluid will be displaced only from the chamber 38 to the rear wheel cylinders, as described above. As before, a premature seating of the valve 90 upon a panic operation of the brakes will result in building up pressure in the chamber 17 which will act in the chamber 87, assisted by the spring 97, to open the valve 90 for the further flow of fluid from the chamber 17 to the chamber 38 to reestablish the desired pressure ratio conditions.

It will be obvious that movement of the plunger 30 or 81 closes the compensating valve 65. When force on the push rod 13 is released, the spring 58 returns the plunger 30 or 81 to its normal position, and such movement is limited to the point where the head 61 engages the inner flange of the spring seat 63 and moves the valve 65 to open position with the disk 60 engaging the cage 57. The spring 34 or 83 will return the rear plunger 12 or 80 to its normal position. The drop in pressure in the chamber 38 upon the releasing of the parts allows the spring 49 or 90 to open its associated valve 45 or 90.

Weight transfer in a decelerating vehicle is proportional to the rate of vehicle deceleration and overall brake torque. Of course the hydraulic brake pressure varies somewhat with the coefficient of friction of the linings and the effectiveness of the brakes. Nevertheless the hydraulic pressure is representative of vehicle deceleration and will not cause a greater error in the operation of the present device than variations in brake torque shifting between the different wheels due to fade or other factors resulting in a change in the coefficient of friction of the brake linings. Accordingly the present mechanism has been found to be highly effective for retarding the rate of increase of rear wheel brake pressures while providing for substantial increases in the rate of pressures supplied to the front wheel brakes. Accordingly the brakes are far more efficient. Locking and sliding of the rear wheels is greatly minimized and a substantially greater percentage of the braking forces is expended at the front wheels where braking is far more effective than at the rear wheels, particularly under weight transfer conditions when the vehicle is being decelerated.

It is to be understood that the forms of the invention shown and described are to be taken as preferred examples of the same and that various changes in the shape, size, and arrangement of the parts may be made as do not depart from the spirit of the invention or the scope of the appended claims.

I claim:

1. In a braking system for a motor vehicle having different sets of wheel cylinders, a fluid pressure generating device comprising a plurality of pressure chambers a first of which is connected to one set of wheel cylinders and the others of which are connected to the remaining wheel cylinders, said other chambers including a chamber substantially smaller than said first chamber, movable members for generating pressures in the respective chambers to displace fluid into said sets of wheel cylinders, means for applying a force to one of said movable members to actuate it, fluid in the system transmitting such force between all of said movable members to simultaneously actuate all of such members upon actuation of said one movable member, and means responsive to the building up of pressure to a predetermined point in said other wheel cylinders for disconnecting all but said small chamber from said remaining wheel cylinders whereby operation of said pressure generating means builds up pressure in said one set of wheel cylinders at a relatively rapid rate and in said other set of wheel cylinders at a relatively slower rate.

2. In a braking system for a motor vehicle having different sets of wheel cylinders, a fluid pressure generating device comprising first, second and third chambers and means for generating pressures in said chambers, said first chambers being connected to one set of wheel cylinders, said second and third chambers being normally connected to each other, said second chamber being of a substantially reduced displacement as compared with said first chamber and being connected to the remaining wheel cylinders, movable members for generating pressures in the respective chambers to displace fluid into said sets of wheel cylinders, means for applying a force to one of said movable members to actuate it, fluid in the system transmitting such force between all of said movable members whereby all of such members are actuated upon actuation of said one movable member, and means responsive to the building up of pressure to a predetermined point in said other wheel cylinders for disconnecting said third chamber from said second chamber whereby solely said second chamber displaces fluid to said remaining wheel cylinders and at a slower rate than fluid is displaced from said first chamber to said one set of wheel cylinders.

3. In a braking system for a motor vehicle having different sets of wheel cylinders, a fluid pressure generating device comprising a master cylinder, a pair of spaced connected plunger heads operative in said master cylinder and forming therebetween a chamber of relatively small displacement, one of said plunger heads forming with one end of said master cylinder a chamber of substantially greater displacement than said chamber of small displacement and connected to one set of wheel cylinders, said chamber of relatively small displacement being connected to the remaining wheel cylinders, a plunger mounted in the end of said master cylinder opposite said first chamber and spaced from the adjacent plunger head to form therewith a third chamber normally communicating with said chamber of small displacement whereby movement of said plunger displaces fluid from said third chamber into said chamber of small displacement and from the latter into said remaining wheel cylinders while fluid pressure in said third chamber moves said plunger heads to displace fluid from said first chamber into said one set of wheel cylinders, and means responsive to a rise in pressure to a predetermined point in said remaining wheel cylinders for closing communication between said third chamber and said chamber of small displacement.

4. In a braking system for a motor vehicle having different sets of wheel cylinders, a fluid pressure generating device comprising a master cylinder body having connected bores of different diameters, a plunger having connected plunger heads spaced from each other and respectively operating in said bores, one plunger head forming with said smaller bore a first pressure chamber communicating with one set of wheel cylinders, said plunger heads forming therebetween an intermediate chamber of smaller cross sectional area than said first chamber whereby the other plunger head will displace therefrom fluid at a lower rate than fluid is displaced from said first chamber by said one plunger head, said intermediate chamber being connected to the remaining wheel cylinders, a second plunger mounted in the end of said larger bore remote from said smaller bore and spaced from the other of said plunger heads to form a third chamber normally communicating with said intermediate chamber whereby operation of said second plunger will displace fluid into said intermediate chamber and thence into said remaining wheel cylinders and pressure in said third chamber will operate said first plunger to displace fluid from said first and intermediate chambers respectively into said one set of wheel cylinders and said remaining wheel cylinders, and means responsive to the building up of a predetermined pressure in said other wheel cylinders for closing communication between said third and intermediate chambers.

5. In a braking system for a motor vehicle having different sets of wheel cylinders, a fluid pressure generating device comprising first, second and third pressure chambers, plunger means for generating pressures in all of said chambers, means for applying the same forces to simultaneously operate said plunger means, said first chamber being connected to one set of vehicle wheel cylinders, said second chamber being of smaller displacement than said first chamber and being connected to the remaining wheel cylinders, a passage normally connecting said second and third chambers whereby operation of said plunger means displaces fluid from said third chamber into said second chamber to be supplied to said remaining wheel cylinders, and a pressure responsive valve device controlling said passage and subject to pressure in said second chamber whereby when such pressure increases to a predetermined point said passage will be closed and fluid will be displaced to said remaining wheel cylinders solely from said second chamber and at a rate lower than the rate of displacement from said first chamber into said one set of wheel cylinders.

6. A system according to claim 5 wherein said pressure responsive device comprises a valve in said second chamber, said passage having a seat engageable by said valve, and means biasing said valve to open position, said valve having a pressure surface open to said second chamber and facing away from said seat whereby, when pressure in said second chamber reaches said predetermined point, said valve will close.

7. A system according to claim 6 wherein said valve is provided with a stem projecting through and of substantially smaller diameter than said seat, said valve having a surface between said stem and said seat, when said valve is closed, exposed to pressure in said third chamber whereby, if said valve closes before said predetermined pressure is built up in said second chamber, a predetermined pressure in said third chamber will act on said valve to restore communication between said second and third chambers until said predetermined pressure is built up in said second chamber.

8. A system according to claim 6 wherein said valve is provided with a stem projecting through and of substantially smaller diameter than said seat, said valve having a surface between said stem and said seat, when said valve is closed, exposed to pressure in said third chamber whereby, if said valve closes before said predetermined pressure is built up in said second chamber, a predetermined pressure in said third chamber will act on said valve to restore communication between said second and third chambers until said predetermined pressure is built up in said second chamber, the end of said stem opposite said valve being exposed to atmospheric pressure.

9. A system according to claim 6 wherein said valve is provided with a stem projecting through and of substantially smaller diameter than said seat, said valve having a surface between said stem and said seat, when said valve is closed, exposed to pressure in said third chamber whereby, if said valve closes before said predetermined pressure is built up in said second chamber, a predetermined pressure in said third chamber will act on said valve to restore communication between said second and third chambers until said predetermined pressure is built up in said second chamber, a bore in which the other end of said stem is slidable in sealed engagement, said other end of said stem being exposed to atmospheric pressure.

10. In a braking system for a motor vehicle having different sets of wheel cylinders, a fluid pressure generating device comprising a master cylinder body having connected bores of different diameters, a plunger having spaced plunger heads respectively operating in said bores and a portion connecting said heads and forming with said heads and with said larger bore an intermediate pressure chamber of relatively small displacement, one of said heads forming with one end of said smaller bore a pressure chamber connected to one set of wheel cylinders, said intermediate chamber being connected to the remaining wheel cylinders, a second plunger operable in the end of said larger bore opposite said smaller bore and forming with the other plunger head a third chamber, a passage connecting said third and intermediate chambers whereby movement of said second plunger displaces fluid from said third chamber into said intermediate chamber to be supplied to said remaining wheel cylinders while pressure in said third chamber effects movement of said plunger heads, and a pressure responsive valve device controlling said passage and subject to pressure in said intermediate chamber when such pressure increases to a predetermined point to disconnect said third chamber from said intermediate chamber.

11. In a braking system for a motor vehicle having different sets of wheel cylinders, a fluid pressure generating device comprising a master cylinder body having connected bores of different diameters, a plunger having spaced plunger heads respectively operating in said bores and a portion connecting said heads and forming with said heads and with said larger bore an intermediate pressure chamber of relatively small displacement, one of said heads forming with one end of said smaller bore a pressure chamber connected to one set of wheel cylinders, said intermediate chamber being connected to the remaining wheel cylinders, a second plunger operable in the end of said larger bore opposite said smaller bore and forming with the other plunger head a third chamber, a passage connecting said third and intermediate chambers whereby movement of said second plunger displaces fluid from said third chamber into said intermediate chamber to be supplied to said remaining wheel cylinders while pressure in said third chamber effects movement of said plunger heads, said passage having a valve seat opening into said intermediate chamber, and a valve in said intermediate chamber biased from said seat to normally connect said third and intermediate chambers, said valve having a pressure surface in said intermediate chamber facing away from said seat whereby, when pressure in said intermediate chamber increases to a predetermined point, said valve will close to disconnect said third and intermediate chambers whereby fluid will be displaced into said remaining wheel cylinders at a lower rate than fluid is displaced into said one set of wheel cylinders from said second mentioned chamber.

12. A system according to claim 11 wherein said valve is provided with a stem substantially smaller than and projecting through said passage to expose to pressure in said third chamber an area of said valve between said seat and said stem whereby, if said valve should close before said predetermined pressure is reached in said intermediate chamber, the building up of pressure in said third chamber to a predetermined point will act against said valve to open it and re-establish communication between said third and intermediate chambers until pressure in said intermediate chamber reaches said predetermined point.

13. A system according to claim 12 wherein said second plunger is provided with an axial bore communicating with the atmosphere, the end of said stem opposite said valve being slidable in said last named bore in sealed engagement therewith whereby said last named end of said stem will be exposed to atmospheric pressure.

14. A system according to claim 12 wherein said valve and said stem are mounted in said master cylinder body laterally offset from said plungers, said master cylinder body having a bore open to atmospheric pressure and in which the end of said stem opposite said valve is slidable in sealed engagement to be exposed to atmospheric pressure.

References Cited in the file of this patent
UNITED STATES PATENTS

| | | |
|---|---|---|
| 2,031,360 | Boughton | Feb. 18, 1936 |
| 2,992,533 | Hodkinson | July 18, 1961 |
| 3,062,010 | Krusemark | Nov. 6, 1962 |

FOREIGN PATENTS

| | | |
|---|---|---|
| 488,771 | Great Britain | July 13, 1938 |